United States Patent
Baumgaertel et al.

(10) Patent No.: US 10,081,356 B2
(45) Date of Patent: Sep. 25, 2018

(54) METHOD FOR AT LEAST PARTIALLY AUTOMATICALLY CONTROLLING A MOTOR VEHICLE

(71) Applicant: Hella KGaA Hueck & Co., Lippstadt (DE)

(72) Inventors: Klaas Hauke Baumgaertel, Delmenhorst (DE); Thomas Niemann, Delmenhorst (DE)

(73) Assignee: HELLA KGAA HUECK & CO., Lippstadt (DE)

( * ) Notice: Subject to any disclaimer, the term of this patent is extended or adjusted under 35 U.S.C. 154(b) by 0 days.

(21) Appl. No.: 15/016,995

(22) Filed: Feb. 5, 2016

(65) Prior Publication Data
US 2016/0229398 A1   Aug. 11, 2016

(30) Foreign Application Priority Data
Feb. 7, 2015   (DE) .................... 10 2015 001 638

(51) Int. Cl.
*B60W 30/095*   (2012.01)
*B60W 50/00*   (2006.01)
(Continued)

(52) U.S. Cl.
CPC .......... *B60W 30/0956* (2013.01); *B60Q 9/00* (2013.01); *B60W 30/06* (2013.01); *B60W 30/09* (2013.01);
(Continued)

(58) Field of Classification Search
CPC ......... B60W 30/0956; B60W 50/0097; B60W 30/09; B60W 30/06; B60W 2050/143;
(Continued)

(56) References Cited

U.S. PATENT DOCUMENTS 7,765,073 B2 * 7/2010 Bricker ................. G01H 1/003
702/34
7,958,962 B2 * 6/2011 Dukart ................ B60R 21/0136
180/274

(Continued)

FOREIGN PATENT DOCUMENTS

CN          202608755 U  * 12/2012
DE   202008016237 (U1)     3/2009
(Continued)

OTHER PUBLICATIONS

Translation of CN202608755U. Obtained via EspaceNet on Dec. 5, 2017. (Year: 2012).*

(Continued)

*Primary Examiner* — Jeffrey C Boomer

(74) *Attorney, Agent, or Firm* — Muncy, Geissler, Olds & Lowe, P.C.

(57) ABSTRACT

A method for at least partially automatically controlling, in particular automatically parking a vehicle, in particular a motor vehicle, includes predicting the movement of the vehicle, detecting the position of a body outside the vehicle, predicting a possible spatial and/or time-related contact area between the vehicle and the body on the outer shell of the vehicle, measuring a structure-borne sound in the predicted spatial and/or time-related contact area and issuing a warning signal the control unit if a previously specified criterion is met by the measured structure-borne sound signal.

7 Claims, 2 Drawing Sheets

Figure 1:
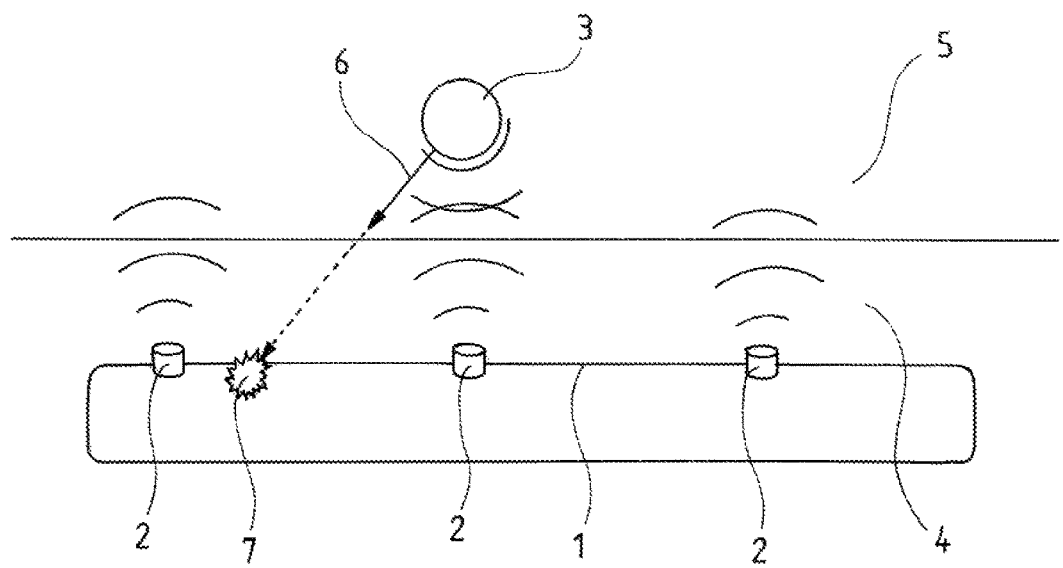

(51) Int. Cl.
*B60W 30/09* (2012.01)
*B60Q 9/00* (2006.01)
*B60W 30/06* (2006.01)
*B60W 50/14* (2012.01)

(52) U.S. Cl.
CPC ... *B60W 50/0097* (2013.01); *B60W 2050/143* (2013.01); *B60W 2420/54* (2013.01); *B60W 2550/10* (2013.01); *B60W 2900/00* (2013.01)

(58) Field of Classification Search
CPC .. B60W 2550/10; B60W 2420/54; B60Q 9/00
See application file for complete search history.

(56) References Cited

U.S. PATENT DOCUMENTS

| | | | |
|---|---|---|---|
| 9,085,273 B2* | 7/2015 | Smykalla | B60R 21/0134 |
| 2003/0111287 A1* | 6/2003 | Enomoto | B60R 21/013 |
| | | | 180/274 |
| 2004/0111200 A1* | 6/2004 | Rao | B60R 21/013 |
| | | | 701/45 |
| 2006/0076799 A1* | 4/2006 | Tanabe | B60R 21/0136 |
| | | | 296/187.03 |
| 2006/0106538 A1* | 5/2006 | Browne | B60R 21/01 |
| | | | 701/301 |
| 2006/0250297 A1* | 11/2006 | Prakah-Asante | B60R 21/0134 |
| | | | 342/70 |
| 2007/0043502 A1* | 2/2007 | Mudalige | B60T 7/22 |
| | | | 701/301 |
| 2007/0228705 A1* | 10/2007 | Rao | B60R 21/0134 |
| | | | 280/735 |
| 2008/0201042 A1* | 8/2008 | Cuddihy | B60R 21/0134 |
| | | | 701/45 |
| 2008/0243342 A1* | 10/2008 | Breed | B60R 21/0132 |
| | | | 701/45 |
| 2009/0188742 A1* | 7/2009 | Dukart | B60R 21/0136 |
| | | | 180/274 |
| 2011/0071733 A1* | 3/2011 | Brandmeier | B60R 19/483 |
| | | | 701/47 |
| 2011/0137528 A1* | 6/2011 | Le | B60R 21/0134 |
| | | | 701/45 |
| 2011/0164562 A1* | 7/2011 | Qiu | H04W 72/1236 |
| | | | 370/328 |
| 2013/0335553 A1* | 12/2013 | Heger | B60Q 9/005 |
| | | | 348/118 |
| 2014/0140518 A1* | 5/2014 | Trinh | B60R 21/0136 |
| | | | 381/56 |
| 2014/0180567 A1* | 6/2014 | Fetsch | G08G 1/168 |
| | | | 701/301 |
| 2014/0200773 A1* | 7/2014 | Wellhoefer | B60R 21/0136 |
| | | | 701/45 |
| 2014/0379222 A1* | 12/2014 | Rittler | B60R 21/0132 |
| | | | 701/45 |
| 2015/0073661 A1* | 3/2015 | Raisch | B62D 15/027 |
| | | | 701/41 |
| 2015/0091718 A1* | 4/2015 | Niemann | G07C 5/0833 |
| | | | 340/436 |
| 2015/0212189 A1* | 7/2015 | Kneifel | G01S 3/80 |
| | | | 367/125 |
| 2015/0294161 A1* | 10/2015 | Schamp | B60K 31/00 |
| | | | 701/37 |
| 2016/0101779 A1* | 4/2016 | Katoh | G06T 7/60 |
| | | | 340/436 |
| 2016/0144817 A1* | 5/2016 | Chambers | B60R 21/0136 |
| | | | 340/436 |
| 2016/0368445 A1* | 12/2016 | Foltin | B60R 21/0134 |

FOREIGN PATENT DOCUMENTS

| | | |
|---|---|---|
| DE | 102008036009 (A1) | 10/2009 |
| DE | 102010031123 (A1) | 1/2012 |
| DE | 102011006984 (A1) | 10/2012 |
| DE | 102013205097 (A1) | 9/2014 |

OTHER PUBLICATIONS

Translation of Abstract of CN202608755U. Obtained via EspaceNet on Dec. 5, 2017. (Year: 2012).*

* cited by examiner

METHOD FOR AT LEAST PARTIALLY AUTOMATICALLY CONTROLLING A MOTOR VEHICLE

The invention relates to a method for at least partially automatically controlling, in particular automatically parking a vehicle, in particular a motor vehicle.

Driver assistance systems such as parking aids in order to avoid collisions during parking manoeuvres or other driving situations, are known and are used in an increasing number of motor vehicles. Driver assistance systems are mostly based on two operating principles. On the one hand there are parking aids which are based on the use of ultrasound sensors. These ultrasound sensors are usually arranged in the rear or in the front bumper of the vehicle and they emit ultrasound signals and receive corresponding reflections. The runtime of a signal emitted and received again is evaluated. The runtime can be used as a basis for calculating the distance of the sensors to a body, on which the emitted ultrasound signal was reflected. Usually acoustic signals are emitted for the benefit of the driver, they give an indication as to the distance of a body behind the vehicle. The disadvantage with using ultrasound sensors consists in that ultrasound sensors have a blind range of approx. 20 cm to 30 cm. This means that bodies present within the blind range behind the vehicle cannot be detected. The blind range is due to the fact that the sensor, after emitting an ultrasound signal requires a certain time to finish vibrating, until the system is ready to receive the reflected signal. If the ultrasound signal is reflected by a body in very close vicinity, the sensor is not yet in a ready-to-receive state when the reflected signal hits the sensor again and the reflected ultrasound signal cannot be detected. Furthermore, during a slow reversing movement such as during a parking manoeuvre hot exhaust air can accumulate between the vehicle being parked and a body behind it, thereby changing the ultrasound conductance of the air such that it is not possible to detect the body behind the vehicle using the ultrasound sensors.

A further operational principle for a driver assistance system is based on measuring the acceleration of the vehicle by means of acceleration sensors. If there is contact with an obstacle, movement of the vehicle is delayed, a fact which is obvious from the measured signals of an acceleration sensor. The disadvantage with using acceleration sensors consists in that these are usually firmly attached to the vehicle frame, and a change in acceleration, i.e. a deceleration due to the contacting does not occur until other components, such the bumper for example have already been damaged due to the contacting. Furthermore with a high-mass vehicle strong forces come into play even for small accelerations. As a consequence, even if only spot-like areas of the vehicle come into contact with a body, very high pressures can act upon the vehicle which however lead to only a weak signal of the acceleration sensor.

The invention is based on the requirement to propose a method for at least partially automatically controlling a vehicle, which is suitable for also determining movements of bodies very close to the vehicle and with which more serious damage can be prevented when there is contact between the vehicle and a body.

The solution to the requirement is a method and a vehicle.

The method for at least partially automatically controlling, in particular automatically parking a vehicle, in particular a motor vehicle, is characterized in that according to the invention the movement of the vehicle is predicted, in that the position of a body present outside the vehicle is detected, in that a possible spatial and/or time-related contact area between the vehicle and the body on the outer shell of the vehicle is predicted, in that a structure-borne sound is measured in the predicted spatial and/or time-related contact area, and in that a warning signal is emitted if based on the measured structure-borne sound signal a previously specified criterion is met.

In many driving situations such as during parking, but also while in a traffic jam or in another kind of heavy traffic it is extremely important to monitor the environment of the vehicle. By means of ultrasound sensors, which are preferably arranged on the bumpers, bodies can be detected outside the blind range of the sensors. In order to estimate whether the vehicle and the body may come into contact with each other, the movement of the vehicle is predicted. This can be done for example by calculating the movement trajectory of the vehicle. From the position of the obstacle determined for example by means of ultrasound sensors and the predicted movement of the vehicle, a possible spatial contact area on the outer shell of the vehicle is predicted, in which the vehicle may come into contact with the obstacle. Apart from the spatial contact area on the outer shell it is also possible to determine a time-related section, in which the obstacle and the outer shell of the vehicle may come into contact with each other. In order to check, whether contact was made between the vehicle and the obstacle, structure-borne sound measurements are taken in the predicted contact area. For example, a structure-borne sound signal or a change in the structure-borne sound signal at a respective position of the bumper can be detected, so that a reliable prediction can be made as to whether contact has been made with the obstacle in that area. Furthermore, a structure-borne sound signal may be recorded as a check in the predicted time-related area, in which contact may happen between the vehicle and the obstacle. For example a time section is recorded in advance, in which contact may happen between the bumper and an obstacle, and in which then a structure-borne sound signal is recorded on the bumper. If it is ascertained that contact was made, a warning signal is sent to, for example, a control unit. The control unit can then initiate measures, which counteract a contact with the obstacle, or which prevent possibly further heavier damage to the vehicle.

In one embodiment of the method following receipt of a warning signal, a signal for decelerating the vehicle is issued. If a structure-borne sound signal measured in a predicted contact area corresponds to a specified criterion, a corresponding warning signal may, for example, be sent to a preferably central control unit. The control unit can then initiate a corresponding counter-measure. For example the control unit can emit a signal, which for example causes the vehicle to be delayed in order to prevent more serious damage. For example, if contact is made in the area of the bumper, and movement in this direction continues further, heavier damage may be caused to e.g. the frame of the vehicle. Decelerating the vehicle or delaying its movement may be effected in different ways, for example, an abrupt emergency stop of the vehicle may be initiated, or the vehicle may be brought slowly to a stop. Due to the method contact of the vehicle with an obstacle for example, can thus be detected faster and more reliably than would be possible for a human driver, and counter-measures can be initiated faster than is possible within the reaction time of a human being.

In a further development of the method a speed profile is included in the prediction of movement of the vehicle. By evaluating a speed profile and the corresponding current movement directions it is possible to predict a contact area between the outer shell of the vehicle and a possibly present obstacle.

In a further development of the method the position of the body is determined by means of ultrasound measurements. In order to determine a contact area between a body outside the vehicle and the outer shell of the vehicle, it is necessary to detect the position of the body as accurately as possible. To this end ultrasound measurements can be taken with ultrasound sensors, which are already employed as standard in motor vehicles with parking assistance systems for monitoring the distance. Outside the blind range of the sensors the position of a body can be detected, wherein as the body enters the blind range of the sensors, the position of the body relative to the vehicle can be modelled with the aid of the predicted movement of the vehicle.

In a further development of the method the previously specified criterion is a known time-related pattern of a structure-borne sound signal belonging to a possible contact. The time-related patterns of the structure-borne sound signals, which are created in various contact events, such as an impact against the bumper or an impact against the bumper with bumper breakage, are different with regard to signal intensity and as regards the frequencies containing the respective spectra. For example, when the bumper makes contact with a body, the intensity for low frequencies is low. By contrast, the intensity in case of a broken bumper is high in comparison to that of the contacting event and the frequency spectrum is a wide-band spectrum. These known characteristics can be used to classify structure-borne sound signals, and depending on the type of contacting event appropriate counter-measures can be taken. For example, in case of a contacting event deceleration can be initiated, whilst for a bumper breakage immediate emergency braking is initiated. Furthermore the control unit may not initiate further measures, if the structure-borne sound signal gives rise to the conclusion that actual contact has not happened.

In a further development of the method the possible contact is a contact of the body with the bumper of the vehicle. A contact between the bumper of the vehicle and the body may, for example, be characterized by a merely light contact, which is expressed by merely low intensities of the structure-borne sound signal. For example if such a structure-borne sound signal is detected, deceleration may be initiated or a parking operation may be aborted.

In a further development of the method the possible contact may be a breakage of the bumper. Breakage of the bumper, for a measured structure-borne sound signal, may be characterized by high intensities and a wide-band frequency distribution. The counter-measure initiated in this case by the control unit may, for example, be immediate emergency braking, in order to prevent more serious damage to the vehicle, such as to the vehicle frame.

In a further development of the method the movement of the vehicle is predicted by means of a linear prediction. Linear prediction is a mathematical method of time-series analysis, where future signal values are estimated by means of a linear function of past signal values. Using this method linear movements of a body towards the vehicle which lie in the blind range of the ultrasound sensors can be modelled.

In a further development of the method movement of the vehicle during a parking operation is not delayed until a time-related pattern of a structure-borne sound signal associated with the bumper of the vehicle coming into contact with a body is detected, and the parking operation is continued, until the parking position is reached. In particular with automatic parking operations in very narrow parking spaces it may be advantageous to continue reversing the vehicle, for example, until very light contact is made with a body behind the vehicle, such as with another vehicle. To this end the position of the body behind the vehicle may be detected, for example, and the spatial area, in which contact between e.g. the bumpers is a probability, can be predicted. In this spatial area of the bumper structure-borne sound measurements may be taken, wherein, if a structure-borne sound signal pattern matching a very light contact is detected, movement of the vehicle is interrupted. Following interruption of the movement the parking operation is continued and for example the position of a body in front of the vehicle is determined. The operation is continued respectively, until a parking position is reached. With this automatic parking operation movement of the vehicle is very small, in order to avoid damage to the vehicles/to other bodies involved.

In a further development of the method, if a warning signal is issued, a passenger safety device is preconditioned. For example reception of a warning signal that breakage has occurred on the bumper of the vehicle, can be interpreted as the beginning of an accident. For example, apart from emergency braking the control unit may also precondition passenger safety devices such as the triggering of airbags. Thus if further features of an accident are present, these features can be triggered faster.

A further aspect of the invention consists in a vehicle with at least one structure-borne sound sensor and at least one ultrasound sensor for monitoring environment of the vehicle, where, according to the invention, provision is made for the vehicle to comprise a computer unit for predicting the movement of the vehicle, for at least one structure-borne sound sensor to comprise a structure-borne sound conducting connection to the outer shell of the vehicle, for the vehicle to comprise an evaluation unit and for the evaluation unit to comprise at least one signal-conducting connection to at least one controlling device of the vehicle. In particular, the vehicle is suitable for performing the method according to the invention. The movement of the vehicle can be predicted by the computer unit and the position of a body outside the vehicle can be detected with the aid of the ultrasound sensors. From this information a time-related or spatial contact area between the vehicle and the body on the outer shell of the vehicle can be determined. In order to check whether a contact has indeed occurred in this area, structure-borne sound measurements can be taken in this area using the structure-borne sound sensors. The structure-borne sound signal is evaluated by the evaluation unit in that the structure-borne sound signal is compared with known pattern of possible contact events. If contact is confirmed in this way, a warning signal can be issued via the signal-conducting connection to a controlling device such as a central control unit of the vehicle in order to initiate for example a deceleration of the vehicle.

Figure 2:
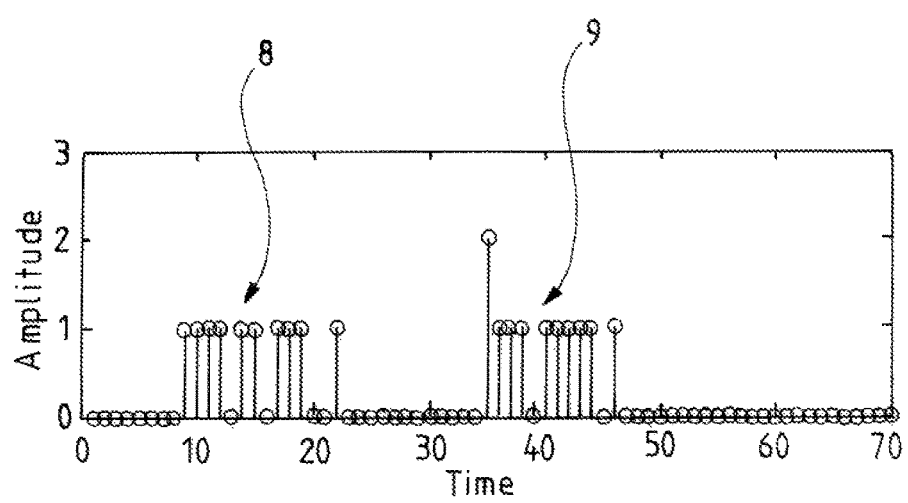
Figure 3:
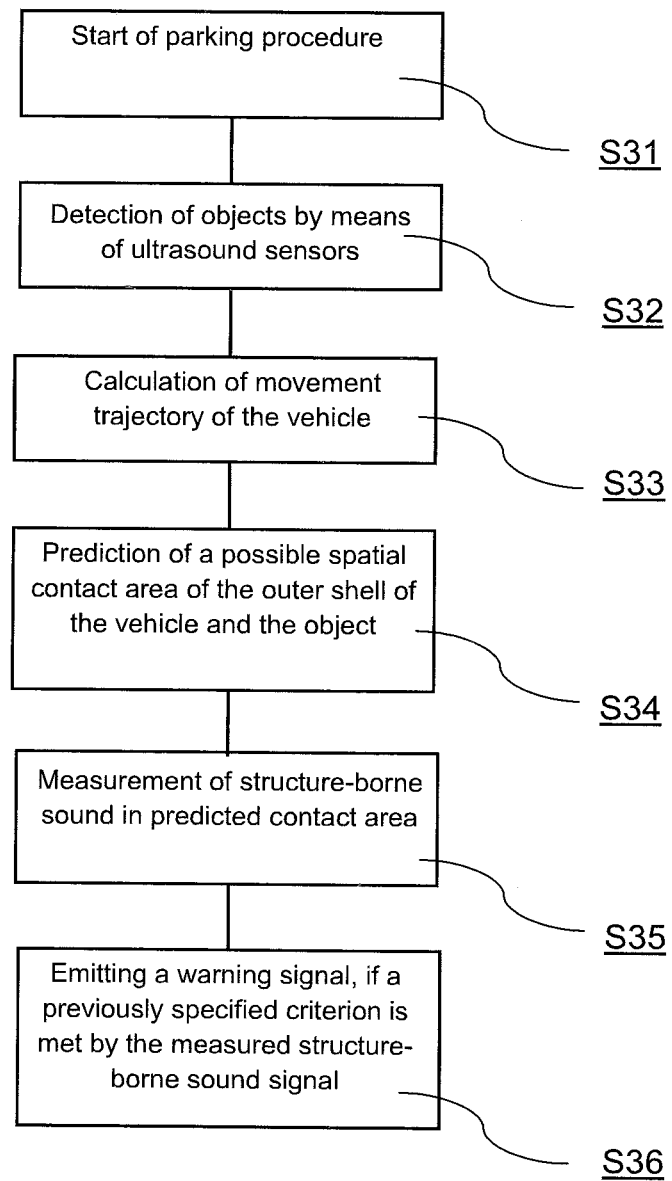

The invention will now be explained in detail by way of an exemplary embodiment shown in the drawing, in which schematically:

FIG. 1: shows an outer shell of a vehicle comprising ultrasound sensors and a body arranged outside the vehicle;

FIG. 2: shows an exemplary illustration of a structure-borne sound signal where contact is made, and of a structure-borne sound signal where contact occurs with breakage of the bumper; and FIG. 3: shows a method in accordance with an exemplary embodiment of the present invention.

FIG. 1 schematically shows a bumper in the rear region of a motor vehicle. The outer shell 1 of the bumper has ultrasound sensors 2 arranged on it. A body 3 present behind the vehicle can be detected by the emitting and receiving of reflected ultrasound signals. Since a certain time section needs to elapse before an ultrasound sensor, having emitted an ultrasound signal, is again ready to receive, bodies situated very close to the sensors cannot be detected. These are then in the blind range 4 of the ultrasound sensors. Only bodies present in a visible range 5 can be detected by the ultrasound sensors. By predicting the movement of the vehicle and thus the relative movement 6 of the body to the vehicle, a contact area 7 between the vehicle and the body 3 can be determined. A structure-borne sound measurement can then be taken in the contact area 7 in order to check whether contact has occurred between the body 3 and the vehicle.

FIG. 2 schematically shows the structure-borne sound signal 8 for a contact between a vehicle outer shell 1 and a body 3. Furthermore the structure-borne sound signal 9 for a contact between the body 3 and the bumper 1 is shown, during which breakage of the bumper has occurred. The structure-borne sound signals 8 and 9 differ above all as regards the intensity of the signal, wherein for a breakage the intensity is substantially higher due to the higher amount of energy being transferred.

FIG. 3 illustrates a flow chart for a method 30 for at least partially automatically controlling a vehicle, which is suitable for also determining movements of bodies very close to the vehicle and with which more serious damage can be prevented when there is contact between the vehicle and a body. First a parking procedure is started (S31). Next, the position of a body present outside the vehicle is detected (S32) by the ultrasound sensors 2. Then, movement of the vehicle is calculated (S33). Then, a possible spatial and/or time-related contact area between the vehicle and the body on the outer shell of the vehicle is predicted (S34). Then a structure-borne sound is measured in the predicted spatial and/or time-related contact area (S35). If a previously specified criterion is met by the measured structure-borne signal, then a warning signal is emitted (S36).

All features mentioned in the above description and in the claims can be combined at random with the features of the independent claim. The disclosure of the invention is thus not limited to the described/claimed feature combinations, rather all feature combinations meaningful in terms of the invention are considered as having been disclosed.

The invention claimed is:

1. A parking method for a vehicle, the method comprising:
predicting a movement of the vehicle;
detecting, using an ultrasound sensor, a position of a body outside the vehicle;
predicting a possible contact area between the vehicle and the body outside of the vehicle based on the predicted movement of the vehicle and the detected position of the body outside the vehicle;
measuring, using a structure-borne sound sensor, a structure-borne sound in the predicted contact area; and
emitting a warning signal when a structure-borne sound signal associated with a bumper of the vehicle making contact with the body outside of the vehicle is detected in the predicted contact area,
wherein, when the warning signal is not issued, a movement of the vehicle during a parking operation is continued until a parking position is reached and, when the warning signal is issued, slowing down or stopping the movement of the vehicle during the parking operation.

2. The method according to claim 1, wherein a speed profile of the vehicle is included in the predicting the movement of the vehicle.

3. The method according to claim 1, wherein the position of the body outside of the vehicle is determined by ultrasound measurements by the ultrasound sensor.

4. The method according to claim 1, wherein the predicting of the movement of the vehicle uses a linear prediction.

5. The method according to claim 1, further comprising, upon emitting the warning signal, preconditioning a passenger safety device.

6. A vehicle, comprising:
at least one structure-borne sound sensor comprising a structure-borne sound conducting connection to a bumper of the vehicle;
at least one ultrasound sensor detecting a body outside of a vehicle;
a computer predicting a movement of the vehicle,
wherein, the computer predicts a possible contact area between the vehicle and the body outside of the vehicle based on the detected body outside of the vehicle and the predicted movement of the vehicle;
an evaluation unit evaluating structure-borne sound signals detected by the at least one structure-borne sensor, the evaluation unit comprising at least one signal-conducting connection to at least one controlling device of the vehicle,
wherein the evaluation unit emits a warning signal when a structure-borne sound signal associated with the bumper of the vehicle making contact with the body outside of the vehicle is detected in the predicted contact area, and
wherein, when the warning signal is not issued, a movement of the vehicle during a parking operation is continued until a parking position is reached and, when the warning signal is issued, slowing down and/or stopping the movement of the vehicle during the parking operation.

7. The method of claim 1, wherein the vehicle is a motor vehicle.

* * * * *